S. MILANO.
SNAP FASTENER.
APPLICATION FILED JUNE 24, 1916.

1,296,001.

Patented Mar. 4, 1919.

INVENTOR
Silvestro Milano
BY
Edson & Bernhard
ATTORNEYS

UNITED STATES PATENT OFFICE.

SILVESTRO MILANO, OF NEW YORK, N. Y.

SNAP-FASTENER.

1,296,001.      Specification of Letters Patent.      Patented Mar. 4, 1919.

Application filed June 24, 1916. Serial No. 105,542.

*To all whom it may concern:*

Be it known that I, SILVESTRO MILANO, a citizen of the United States, residing at the city of New York, county of Bronx, and State of New York, have invented a certain new and useful Snap-Fastener, of which the following is a specification.

This invention is a snap fastener, the same being intended for use in fastening the meeting edges of garments, and, more particularly, for securing together the two edges of women's waists and other fabrics.

Fasteners of this kind are now generally used on women's body garments composed of quite thin fabrics, hence it is desirable that the fastener shall be of compact construction and relatively small dimensions. At the same time, it is requisite that the fastener shall be efficient in the locking engagement between the parts thereof, easily operated to connect or disconnect the same, readily and securely applied to the garment, economical of manufacture, and susceptible of production by automatic machinery.

To the attainment of the foregoing ends, my fastener comprises, as usual, a post member and a socket member, but the salient feature of the socket member is a plate provided, in addition to the thread apertures for its attachment, with a peripheral curled or turned over flange, with which plate coöperates a spring loosely retained in position by the curled or turned over flange, said spring being adapted for engagement with the post member when the latter is inserted into the socket member.

A characteristic feature of the spring is the triangular shape thereof, the same being arranged for its angles or corners to fit into the annular space provided between the plate and the curled over flange of the socket member, so that the angles or corners will be held by the plate in order to retain the spring in a connected relation to said plate. The triangular form of the spring is important for the reason that the legs of the triangle are adapted for engagement with the post whereas the angles or corners have engagement with the flange, said angles or corners alternating with the thread holes of the plate. The spring is not held rigidly or fixedly in position, but contrariwise it is free to shift relatively to the plate, so that the spring can easily be thrust aside by the needle when sewing the socket member to the fabric.

My socket member comprises two parts only, *i. e.* the plate and the spring. Said plate is a simple stamping composed of sheet metal, whereas the spring is a single piece of wire bent to the required shape, each of said parts being readily made by automatic machinery, easily assembled, and the flange turned or curled over to retain the spring in a connected relation to the plate, whereby the entire device is adapted to be economically and rapidly manufactured.

An important function of my new socket member is that it is reversible with respect to the post member, *i. e.* it is capable of locking engagement with the post member in either a normal position or in an inverted (reversed) position, whereby the socket member may be attached with either of its two faces in contact with the fabric.

In the drawings,—

Figure 1:
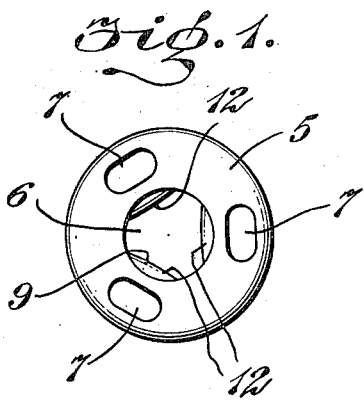
Figure 1 is a plan view of the socket member of my improved fastener, looking at one side of said socket member.
Figure 3:
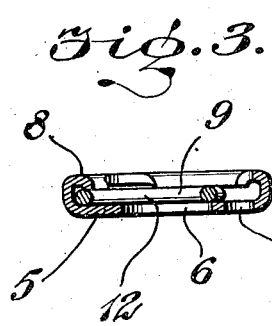
Fig. 3 is a cross section on the line 3—3 of Fig. 2.
Figure 2:
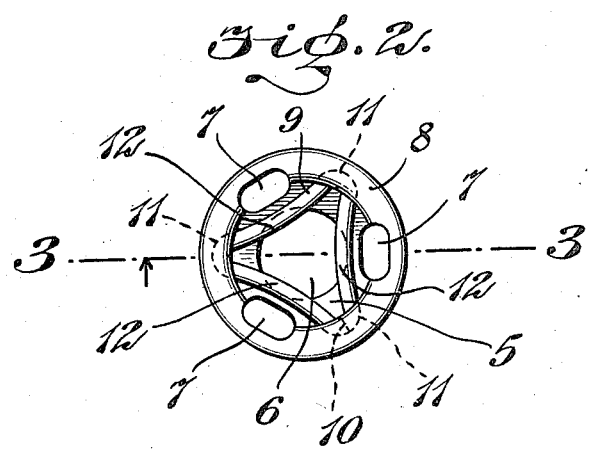
Fig. 2 is a plan view looking at the reverse side of said socket member.

The important feature of the present invention is the socket member shown in Figs. 1, 2 and 3 of the drawings. Said socket member is composed of a sheet metal plate 5 provided with a central aperture 6 adapted to receive the post. In addition to said central aperture, the plate is provided with a number of thread holes 7 positioned equidistantly around the central aperture 6, and, furthermore, the marginal portions of the plate is curled or turned over upon itself to produce a flange 8, the inner edge of which is exterior to the central hole and substantially exterior to the thread holes 7.

9 designates a spring, preferably, though not essentially, triangular in shape, said spring being bent from a single piece of wire. The triangular shape shown in Fig. 2 is split or divided at 10 so as to impart a certain amount of resiliency to the spring. The wire is bent into the triangular form to produce corners or angles 11, and intermediate the corners or angles the legs of the triangle, or the sides thereof, are bowed or deflected inwardly at 12. The triangular spring is positioned in a novel relation to the sheet metal plate in several particulars; first, the angles or corners 11 of the spring are fitted within the annular space provided between the curled flange 8 and the metal plate 5, so that the only part of the spring incased by the sheet metal plate are the corners or angles of said spring. The bowed sides 12 of the triangular spring cross the edge portions of the central opening 6 of the plate in order that the bowed sides of the spring will have proper engagement with the post so as to retain the socket member of the fastener in a connected relation to the post member of said fastener. The triangular spring is not attached fixedly to the sheet metal plate so as to have a predetermined relation at all times thereto; on the contrary, the angles or corners of the spring are received loosely in the annular space of the plate, as a result of which the spring is shiftable to a certain extent relatively to the plate. This is advantageous for the reason that it is not necessary to provide means for rigidly fastening the spring to the plate. Again, should the spring move into such a position that its angles or corners are over the thread holes 7, the thrust of a needle through said holes 7 in the operation of sewing the socket member to the fabric will displace the spring in one direction or the other. Furthermore, in the normal and proper relation of the spring to the plate, the angles or corners 11 are in alternate relation to the thread holes 7, whereby the spring will not in any case interfere with the operation of sewing the socket member to the fabric.

It will be noted, furthermore, that the opening in the triangular spring is in register with the central opening 6 of the plate. This construction is advantageous for the reason that the socket member is thus brought into a reversible relation to the post member. It is apparent that unskilled operators may sew the socket member to the fabric, with one face or the other in contact with said fabric. In some prior devices this is quite a disadvantage, for the reason that it is necessary to detach the sewed-on socket member and reverse it in order that it may receive the post member. In my device, however, the socket member may be sewed on the fabric with either face of said socket member in contact with said fabric, for the reason that the post member can pass through the plate and the spring from one side or the other.

Figure 4:
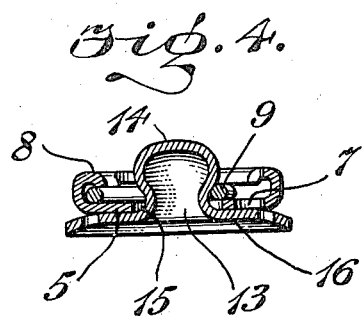
Fig. 4 is a vertical section illustrating the relation of the socket member to the post member.

In Fig. 4 I have shown an ordinary form of post 13 having a head 14 which provides a groove 15 in the shank of the post, said post being integral with a plate 16, the latter being either perforated or notched, as desired, for the reception of the threads by which the post member is sewed to a piece of fabric.

I desire to call attention to the simple construction of my socket member, for the reason that it is composed of two parts only, each capable of manufacture by automatic machinery and adapted to be readily assembled so as to position the spring relatively to the plate, and thereafter permit the edge portion of the plate to be turned or curled over in a manner to loosely retain the spring in position, whereby the socket member as a complete article can be manufactured rapidly and economically by automatic machinery.

The triangular shape of the spring used in my fastener is quite important, for the reason that said spring is adapted to be bent and inserted into the plate or rim by automatic machinery. My spring requires the wire to be bent at two points of the triangle, the third point of which is produced by bringing the two ends of the wire into substantial contact with each other, so as to leave the spring disconnected at that point and thus utilize the inherent elasticity of the wire.

Furthermore, in my device the spring is not held rigidly in position with respect to the plate, but on the contrary, the spring is retained loosely in the space between the plate and the curled over flange, thus contributing to the freedom of action of the split triangular spring.

It will be noted that the spring is bent at two points 11 which are substantially in contact with the peripheral wall formed by the curled over flange although the spring as an entirety is free to shift in position by turning on the axis of the perforated plate so as to avoid interfering with the passage of a needle and thread when sewing the plate to a garment, and, further, that the two sides of the triangular spring next to the split part of said spring can yield or give freely to permit the insertion or withdrawal of the post member of the fastener.

Having thus fully described the invention, what I claim as new and desire to secure by Letters Patent is:

In a snap fastener, a socket piece provided at its edge with a turned over flange and with a plurality of thread openings positioned substantially intermediate said flange and the axis of the socket piece, and a gripping member of resilient wire bent to generally triangular shape with its sides arranged in position to engage a head, the extremities of the sides at two corners of the triangle being normally in close relation to the outer wall of the flange and the extremities of the sides at the other corner of the triangle being normally spaced away from the outer wall of the flange, said spring being normally retained loosely in position by the flange of the socket member whereby the spring is free to shift its position relatively to the thread openings.

In testimony whereof I have signed my name to this specification.

SILVESTRO MILANO.

Copies of this patent may be obtained for five cents each, by addressing the "Commissioner of Patents, Washington, D. C."